United States Patent
Miyazaki

(10) Patent No.: US 12,001,029 B2
(45) Date of Patent: Jun. 4, 2024

(54) ELECTROCHROMIC ELEMENT, AND LENS UNIT AND IMAGING APPARATUS INCLUDING THE SAME

(71) Applicant: CANON KABUSHIKI KAISHA, Tokyo (JP)

(72) Inventor: Kazuya Miyazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 17/669,266

(22) Filed: Feb. 10, 2022

(65) Prior Publication Data

US 2022/0260848 A1    Aug. 18, 2022

(30) Foreign Application Priority Data

Feb. 16, 2021    (JP) .................. 2021-022450

(51) Int. Cl.
| | | |
|---|---|---|
| G02B 27/58 | (2006.01) | |
| G02F 1/153 | (2006.01) | |
| G02F 1/155 | (2006.01) | |
| G03B 11/00 | (2021.01) | |
| G02F 1/1514 | (2019.01) | |

(52) U.S. Cl.
CPC ............. *G02B 27/58* (2013.01); *G02F 1/155* (2013.01); *G03B 11/00* (2013.01); *G02F 2001/15145* (2019.01); *G02F 1/153* (2013.01); *G02F 2203/48* (2013.01)

(58) Field of Classification Search
CPC ......... G02B 27/58; G02F 1/155; G02F 1/153; G02F 2001/15145; G02F 2203/48; G02F 1/157; G03B 11/00

USPC .................................................. 359/265, 545
See application file for complete search history.

(56) References Cited

U.S. PATENT DOCUMENTS

| | | | | |
|---|---|---|---|---|
| 3,741,629 A | * | 6/1973 | Kahn ................ | G02F 1/134309 349/193 |
| 6,621,616 B1 | * | 9/2003 | Bauer .................. | G01J 1/0204 257/E31.118 |
| 2001/0017985 A1 | * | 8/2001 | Tsuboi ................. | G02B 26/005 348/E5.04 |
| 2003/0227664 A1 | * | 12/2003 | Agrawal ............... | G02F 1/1533 359/269 |

(Continued)

FOREIGN PATENT DOCUMENTS

| | | |
|---|---|---|
| JP | 2002537582 A | 11/2002 |
| WO | 0049455 A1 | 8/2000 |

*Primary Examiner* — George G. King
(74) *Attorney, Agent, or Firm* — CANON U.S.A., INC. IP Division

(57) ABSTRACT

In an electrochromic element including a pair of electrodes and an electrochromic layer disposed between the pair of electrodes, a shape of a light modulating region viewed from a normal direction of the electrode being circular, when a sheet resistance of the electrode is $r_s$ ($\Omega$), a resistance of the electrode is r ($\Omega$), a diameter of the light modulating region is L [m], a distance between the pair of electrodes is d (m), the resistivity of the electrochromic layer is $\rho$ ($\Omega$), and a resistance of the electrochromic layer is R ($\Omega$), a resistance ratio (r/R) between the electrode and the electrochromic layer, as shown by $r/R=(r_s L^2)/(\rho d)$, is 2 or more and 20 or less.

13 Claims, 9 Drawing Sheets

(56) References Cited

U.S. PATENT DOCUMENTS

| | | | | |
|---|---|---|---|---|
| 2010/0039689 | A1* | 2/2010 | Sayag | G03B 9/08 359/241 |
| 2010/0134866 | A1* | 6/2010 | Foller | G03B 9/02 359/275 |
| 2012/0154891 | A1* | 6/2012 | Yeh | H04N 13/31 359/265 |
| 2013/0206323 | A1* | 8/2013 | Blackburn | B29D 11/0074 264/1.7 |
| 2014/0192257 | A1* | 7/2014 | Gleason | H04N 23/73 348/363 |
| 2015/0362815 | A1* | 12/2015 | Bjornard | G02B 27/58 427/523 |
| 2016/0033837 | A1* | 2/2016 | Bjornard | G02F 1/153 29/825 |
| 2016/0091768 | A1* | 3/2016 | Gleason | G03B 7/02 359/275 |
| 2016/0231533 | A1* | 8/2016 | Mercado | G02F 1/1533 |
| 2017/0219901 | A1* | 8/2017 | Kumai | G03B 11/00 |
| 2017/0329199 | A1* | 11/2017 | Yashiro | G02F 1/1503 |
| 2019/0227401 | A1* | 7/2019 | Yutani | G02F 1/155 |
| 2020/0050073 | A1* | 2/2020 | Ikeda | G02F 1/1523 |
| 2020/0081311 | A1* | 3/2020 | Ah | C09B 21/00 |
| 2020/0292906 | A1* | 9/2020 | Miyazaki | G02F 1/1533 |

* cited by examiner

ELECTROCHROMIC ELEMENT, AND LENS UNIT AND IMAGING APPARATUS INCLUDING THE SAME

BACKGROUND OF THE INVENTION

Field of the Invention

The present disclosure relates to an electrochromic element, and a lens unit and an imaging apparatus including the electrochromic element.

Description of the Related Art

An electrochromic (hereinafter, "electrochromic" may be referred to as "EC") element is an optical element including a pair of electrodes and an EC layer disposed between the electrodes, wherein a voltage is applied between the pair of electrodes to oxidize or reduce a compound in the EC layer, thereby adjusting the hue or quantity of light in the visible light band.

EC elements have been applied to products such as variable transmittance windows for aircrafts and anti-glare mirrors for automobiles, and in recent years, they have been tried to be applied to ND filters, half ND filters, apodization filters, etc., in addition to apertures and shutters for imaging devices. The apodization filter is an optical element for smoothing the contour of a blurred image, and has a transmittance distribution in which the transmittance decreases as the distance from the optical axis increases.

Japanese Patent Application Laid-Open No. 2002-537582 discloses a technique in which a voltage drop from the outer peripheral portion of an EC element toward the center of the element is increased to achieve a desired transmittance distribution by providing a conductive connection portion for short-circuiting a pair of electrodes at the center of the element and then applying a voltage from the outer peripheral portion of the element.

In the above-described conventional EC element, a preferable transmittance distribution is realized by defining the resistance range of the electrode, but the setting of the configuration requirements is not sufficient. That is, the transmittance distribution of the solution type EC element depends on the resistance ratio of the electrode resistance and the solution resistance per unit width, and the resistance ratio depends specifically on the sheet resistance of the electrode, the diameter of the light modulating region, the distance between the pair of electrodes, and the resistivity of the electrochromic layer (solution). Therefore, in order to realize a preferable transmittance distribution, it is necessary to define these.

SUMMARY OF THE INVENTION

It is an aspect of the present disclosure to provide an EC element capable of achieving a suitable transmittance distribution in a solution type EC element for supplying power from the outer periphery of a light modulating region. It is another aspect of the present disclosure to provide an EC element capable of forming a suitable transmittance distribution by following the aperture diameter of the mechanical diaphragm of a lens in the solution type EC element for supplying power from the outer periphery of the light modulating region. It is further another aspect of the present disclosure to provide a lens unit and an imaging apparatus having excellent optical characteristics by using the EC element.

According to a first aspect of the present disclosure, there is provided an electrochromic element including: a pair of electrodes and an electrochromic layer disposed between the pair of electrodes, a shape of a light modulating region viewed from a normal direction of the electrode being circular, wherein when a sheet resistance of the electrode is $r_s$ [Ω], a resistance of the electrode is r [Ω], a diameter of the light modulating region is L [m], a distance between the pair of electrodes is d [m], the resistivity of the electrochromic layer is ρ [Ωm], and a resistance of the electrochromic layer is R [Ω], a resistance ratio (r/R) between the electrode and the electrochromic layer, as shown in the following equation (1), is 2 or more and 20 or less.

$$r/R = (r_s L^2)/(\rho d) \quad (1)$$

According to a second aspect of the present disclosure, there is provided a lens unit including: an imaging optical system including a plurality of lenses; and a light modulating element that electrically controls apodization effect on the imaging optical system, wherein the light modulating element is the electrochromic element according to the above present disclosure.

According to a third aspect of the present disclosure, there is provided an imaging apparatus including: an imaging optical system including a plurality of lenses; a light modulating element that electrically controls apodization effect on the imaging optical system; and an imaging device that receives light that has passed through the imaging optical system, wherein the light modulating element is the electrochromic element according to the above present disclosure.

Further features of the present disclosure will become apparent from the following description of exemplary embodiments with reference to the attached drawings.

DESCRIPTION OF THE EMBODIMENTS

Hereinafter, a configuration of an electrochromic element (EC element) according to the present disclosure will be described in detail with reference to the drawings by way of example. However, the configuration, relative arrangement and the like described in this embodiment are not intended to limit the scope of the present disclosure unless otherwise stated.

EC Element

Figure 1A:
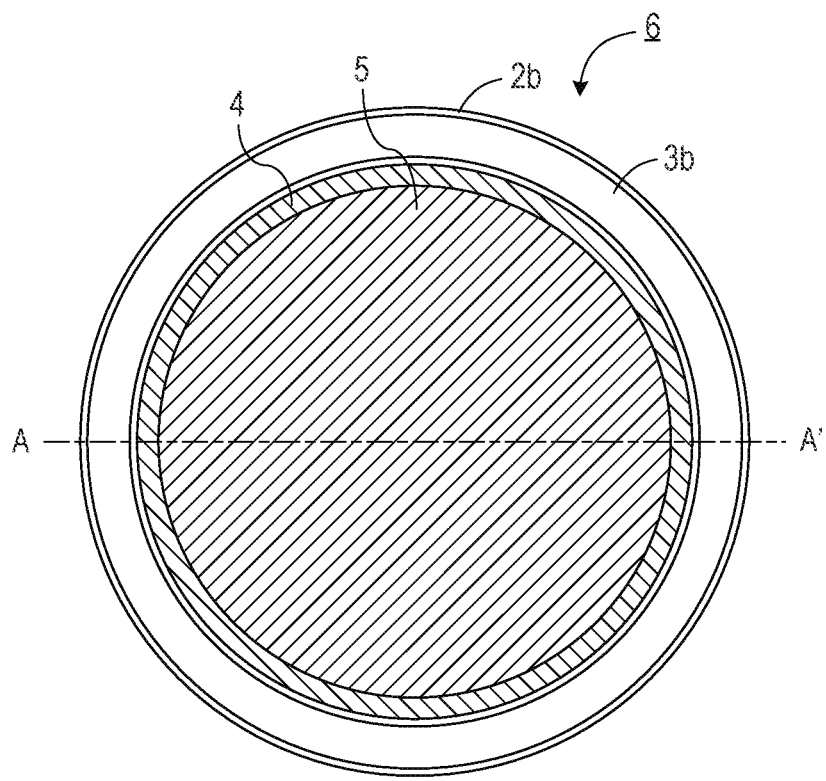
FIG. 1A is a schematic end face view illustrating the planar shape of one embodiment of an EC element of the present disclosure.
Figure 1B:
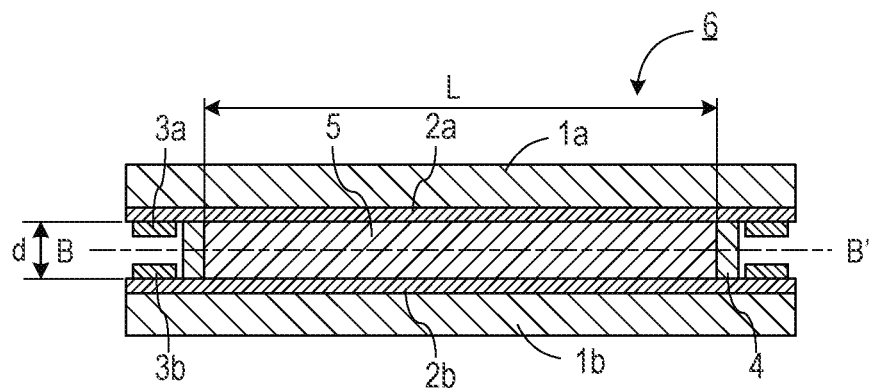
FIG. 1B is a schematic end face view in the thickness direction of the embodiment of the EC element of the present disclosure.

First, the configuration of the EC element of the present disclosure will be described with reference to FIG. 1A and FIG. 1B. FIG. 1A is a view schematically illustrating the planar shape of an EC element 6 according to an embodiment of the present disclosure and FIG. 1B is a view schematically illustrating the cross-sectional shape of the EC element 6. FIG. 1A is a schematic end face view of the EC element 6 at the B-B' position in FIG. 1B, and FIG. 1B is a schematic end face view of the EC element 6 at the A-A' position passing through the element center in FIG. 1A.

As illustrated in FIG. 1A and FIG. 1B, the EC element 6 includes a pair of substrates 1a and 1b having a pair of electrodes 2a and 2b respectively formed thereon, and an electrochromic layer (EC layer) 5 disposed in a space defined by the pair of electrodes 2a and 2b and the sealing material 4. Bus wirings 3a and 3b for ensuring uniform voltage application from the outside of the element are formed annularly on the outer peripheries of the pair of transparent electrodes 2a and 2b outside the sealing material 4. In FIG. 1A, a region surrounded by the sealing material 4 is a light modulating region of the EC element 6, and when viewed from the normal direction of the electrodes 2a and 2b, the light modulating region has a circular shape. Members constituting the EC element 6 will be described in detail.

EC Layer

The EC layer 5 is preferably a solution layer in which an electrochromic compound (EC compound) is dissolved in an organic solvent, and the solution layer may contain an electrolyte. The EC layer 5 may be formed by a method in which a liquid containing an EC compound and prepared in advance is injected into a gap provided between the electrodes 2a and 2b by a vacuum injection method, an atmospheric injection method, a meniscus method or the like.

The EC compound used in the present disclosure may be an anodic electrochromic compound that colors from a transparent state by an oxidation reaction or a cathodic electrochromic compound that colors from a transparent state by a reduction reaction, both of which may be used. The EC compound is preferably an organic compound. It is preferable to use the anodic EC compound and the cathodic EC compound together, since the coloring efficiency with respect to the current becomes high. In the present specification, an element having both the anodic EC compound and the cathodic EC compound is referred to as a complementary EC element. The anodic EC compound is also referred to as an anodic material, and the cathodic EC compound is also referred to as a cathodic material. Further, in the present disclosure, an anodic compound or a cathodic compound which does not color even if oxidation reaction or reduction reaction occurs, that is, which is not an EC compound, may be used in addition to the EC compound.

When the complementary EC element is driven, electrons are extracted from the EC compound by an oxidation reaction at one of the electrodes, and electrons are received by the EC compound by a reduction reaction at the other of the electrodes. A radical cation may be formed from a neutral molecule by an oxidation reaction. Further, a radical anion may be formed from a neutral molecule by a reduction reaction, or a radical cation may be formed from a dicationic molecule. Since the EC compounds color at both of the electrodes 2a and 2b on the substrates 1a and 1b, it is preferable to employ the complementary EC element when a large optical density change is required during coloring.

Examples of the organic EC compound include conductive polymers such as polythiophene and polyaniline, and organic low molecular weight compounds such as viologen compounds, anthraquinone compounds, oligothiophene derivatives, and phenazine derivatives.

The EC layer 5 may contains only one kind of the EC compounds or may have a plurality of kinds of the EC compounds. When the EC layer 5 contains a plurality of kinds of the EC compounds, it is preferable that the difference between the redox potentials of the EC compounds is small. When the EC layer 5 contains a plurality of kinds of the EC compounds, the anodic EC compound and the cathodic EC compound may be contained in a total of four or more kinds or in a total of five or more kinds. When the EC layer 5 contains a plurality of kinds of the EC compounds, the redox potential of the plurality of the anodic materials may be within 60 mV, and the redox potential of the plurality of the cathode materials may be within 60 mV. When the EC layer 5 contains a plurality of kinds of the EC compounds, the plurality of the kinds of the EC compounds may include a compound having an absorption peak at 400 nm or more and 500 nm or less, a compound having an absorption peak at 500 nm or more and 650 nm or less, and a compound having an absorption peak at 650 nm or more.

The absorption peak indicates a peak with a full width at half maximum of 20 nm or more. The state of a material when absorbing light may be an oxidized state, a reduced state or a neutral state.

An electrolyte which the EC layer 5 may contain is not limited as long as the electrolyte is an ion-dissociable salt, and exhibits good solubility in a solvent and high compatibility when it is a solid electrolyte.

Especially, electrolytes having electron-donating property are preferable. These electrolytes may also be referred to as supporting electrolytes. The electrolyte may include, for example, inorganic ion salts such as various alkali metal salts, alkaline earth metal salts, or the like, quaternary ammonium salts, cyclic quaternary ammonium salts or the like. Specifically, the electrolytes may include alkali metal salts of Li, Na, or K such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, $KCl$, or the like, or quaternary ammonium salts and cyclic quaternary ammonium salts such as $(CH_3)_4NBF_4$, $(C_2H_5)_4NBF_4$, $(n\text{-}C_4H_9)_4NBF_4$, $(n\text{-}C_4H_9)_4NPF_6$, $(C_2H_5)_4NBr$, $(C_2H_5)_4NClO_4$, $(n\text{-}C_4H_9)_4NClO_4$, or the like.

The solvent for dissolving the EC compound and the electrolyte is not particularly limited as long as the EC compound and the electrolyte can be dissolved, but a solvent having a polarity is particularly preferred. Specifically, the solvent may be water or an organic polar solvent such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propiononitrile, 3-methoxypropiononitrile, benzonitrile, dimethylacetamide, methylpyrrolidinone, dioxolane, or the like.

The EC layer 5 may further contain a polymer matrix and a gelling agent. In this case, the EC layer 5 becomes a liquid having high viscosity, and in some cases becomes a gel state. The polymer may be, for example, polyacrylonitrile, carboxymethylcellulose, pullulan-based polymer, polyvinyl chloride, polyethylene oxide, polypropylene oxide, polyurethane, polyacrylate, polymethacrylate, polyamide, polyacrylamide, polyester, Nafion (registered trademark), or the like, and PMMA is preferably used.

Substrate

The pair of substrates 1a and 1b are both transparent, and a glass material such as colorless or colored glass, tempered glass, or the like is used for them. As these glass materials, optical glass substrates such as Coming #7059, BK-7, or the like can be suitably used. Further, the substrates 1a and 1b are preferably made of a material having high rigidity and less distortion. In the present disclosure, "transparent" indicates a state in which the transmittance of visible light is 50% or more.

Electrodes

The electrodes 2a and 2b are both transparent, and may be made of, for example, indium tin oxide alloy (ITO), fluorine doped tin oxide (FTO), tin oxide (NESA), indium zinc oxide (IZO), graphene, or the like. A conductive polymer improved in conductivity by doping treatment or the like, such as, for example, a complex of polyaniline, polypyrrole, polythiophene, polyacetylene, polyparaphenylene, or polyethylenedioxythiophene (PEDOT) with polystyrene sulfonic acid, or the like is suitably used for them.

Since the EC element 6 according to the present disclosure preferably has a high transmittance in an achromatized state, the electrodes 2a and 2b are particularly preferably made of a transparent material such as ITO, IZO, NESA, PEDOT: PSS, graphene, or the like. These can be used in various forms such as bulk or fine particles. These electrodes may be used alone or in combination.

Bus Wirings

The bus wirings 3a and 3b are formed as power supply portions for ensuring uniform voltage application from outside the light modulating region, and a low-resistance metal material can be suitably used for them. For example, a thin film or the like of silver, palladium, copper, aluminum, silver-palladium-copper alloy (APC), aluminum-neodymium alloy, or the like may be suitably used. The bus wirings 3a and 3b are preferably formed on the outer periphery of the electrodes 2a and 2b in an annular shape surrounding the light modulating region, and in order to prevent a voltage drop in the bus wirings 3a and 3b, a plurality of power supply portions are preferably provided for one bus wiring. For example, it is preferable that the bus wiring arrangement and the power supply portion arrangement are symmetrical with respect to the element center as much as possible by arranging the four power supply portions symmetrically with respect to the respective bus wiring and rotating only one of the substrates by 45° from the arrangement where the power supply portions overlap to laminate.

Sealing Material

The sealing material 4 is preferably a chemically stable material which does not permeate gas and liquid and does not inhibit the redox reaction of the EC compound. The sealing material 4 may be, for example, an inorganic material such as glass frit or the like, an organic material such as epoxy resin, or the like.

The EC element 6 of the present disclosure may include a spacer having a function of defining a distance between the electrodes 2a and 2b. The function of the spacer may be provided by the sealing material 4. The spacer may be made of an inorganic material such as silica beads, glass fibers or the like, or an organic material such as polydivinylbenzene, polyimide, polytetrafluoroethylene, fluororubber, epoxy resin, or the like.

Resistance Ratio Between Electrodes and EC Layer

Next, the ratio (r/R) of the electrode resistance r to the resistance R of the EC layer, which is a feature of the present disclosure, will be described. First, the electrode resistance r [Ω] per unit width Δw [m] in the diameter L [m] (see FIG. 1B) of the light modulating region can be expressed by using the sheet resistance $r_s$ [Ω] as follows.

$$r = (L/\Delta w)r_s$$

The resistance R [Ω] of the EC layer in the thickness direction per unit width Δw [m] in the diameter L [m] of the light modulating region can be expressed by using the resistivity ρ[Ωm] of the EC layer and the distance d [m] between the pair of electrodes (see FIG. 1B), as follows.

$$R = (d/(\Delta wL))\rho$$

Therefore, the resistance ratio (r/R) becomes as follows and is expressed using four independent parameters.

$$r/R = (r_s L^2)/(\rho d) \tag{1}$$

Here, the resistivity ρ of the EC layer will be described. The resistance of the EC layer is expressed as the sum of three resistance components: solution resistance without electrochemical reaction, charge transfer resistance involved in charge transfer reaction between the EC compound molecule and the electrodes, and diffusion resistance involved in diffusion of the EC compound molecule in the EC layer. These three resistance components vary greatly depending on the concentration of the EC material and additives such as solvents, thickeners, or the like, but can be easily determined by conducting an AC impedance analysis of the EC element.

Figure 2:
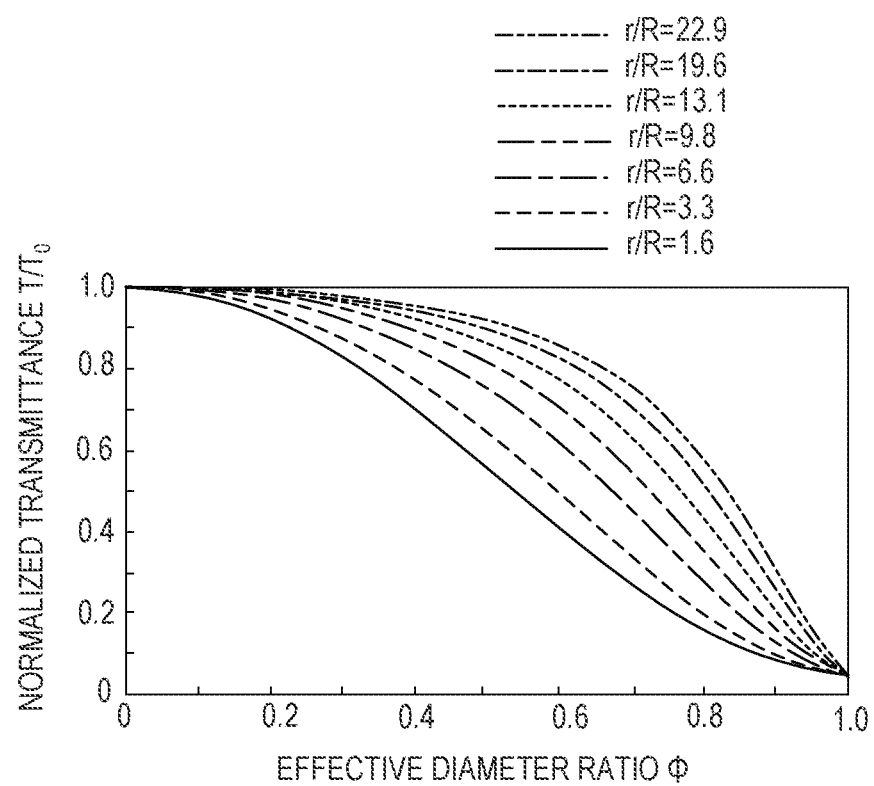
FIG. 2 is a diagram showing the transmittance distributions of EC elements whose resistance ratio are changed only by the sheet resistance of the electrodes.

FIG. 2 shows the transmittance distributions when the resistance ratio (r/R) is changed between 1.6 and 22.9 by changing only the sheet resistance $r_s$ of the electrodes among the four parameters of the equation (1).

Here, the transmittance (T) is a normalized transmittance (T/T$_0$) obtained by normalizing with the transmittance (T$_0$) of the center value of the EC element as 1, and a condition in which the normalized transmittance (T/T$_0$)=0.045 (corresponding to light attenuation for 4.5 steps with respect to the center of the element) at the position of the effective diameter ratio Φ=1.0 is applied. At this time, the set four parameters and the resistance ratio values are shown in Table 1.

TABLE 1

| $r_s$ [Ω] | 10 | 20 | 40 | 60 | 80 | 120 | 140 |
|---|---|---|---|---|---|---|---|
| L [mm] | 46 | 46 | 46 | 46 | 46 | 46 | 46 |
| d [μm] | 30 | 30 | 30 | 30 | 30 | 30 | 30 |
| ρ [Ωm] | 430.88 | 430.88 | 430.88 | 430.88 | 430.88 | 430.88 | 430.88 |
| r/R | 1.6 | 3.3 | 6.6 | 9.8 | 13.1 | 19.6 | 22.9 |

It can be seen that the resistance ratio (r/R) decreases and the transmittance at the intermediate effective diameter ratio position decreases. When the image simulation was performed using the transmittance distribution obtained in this manner, it was found that the blurred image became small, although the contour became largely blurred as the resistance ratio decreased.

When the resistance ratio (r/R)=22.9 (the sheet resistance $r_s$=140Ω), the size of the blurred image is sufficient, but the gradation effect is small, and it is not preferable as an apodization filter. Further, when the resistance ratio (r/R)=1.6 (the sheet resistance $r_s$=10Ω), although the gradation effect of the blurred image is large, the image becomes too small, and is not preferable as an apodization filter. Therefore, it can be said that the range of the resistance ratio (r/R) in which a transmittance distribution suitable as an apodization filter can be realized is 2 or more and 20 or less. Further, when this is converted into a suitable range of the normalized transmittance (T/T$_0$) at the position of the effective diameter ratio Φ=0.7, it becomes 0.3 or more and 0.75 or less, preferably 0.5 or more and 0.75 or less. Here, the position of the effective diameter ratio Φ=0.7 is a position where the change of the normalized transmittance (T/T$_0$) when the resistance ratio (r/R) is changed is close to the maximum.

Response to Diameter Change

Next, with respect to the EC element (the element of (r/R)=9.8 in Table 1) in a suitable resistance ratio range, it will be described that even when the voltage applied to make the mechanical diaphragm follow is increased, the EC element can be kept in a suitable transmittance distribution range if it is normalized by an effective diameter of the EC element.

Figure 3:
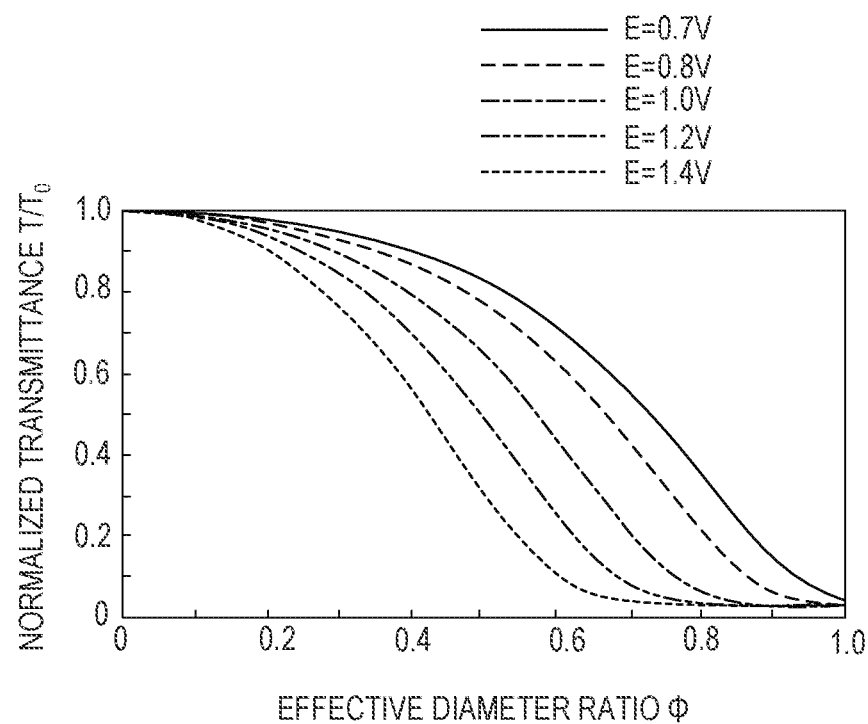
FIG. 3 is a diagram showing the transmittance distribution of an EC element with the resistance ratio of 9.8 when the voltage is increased.
Figure 4:
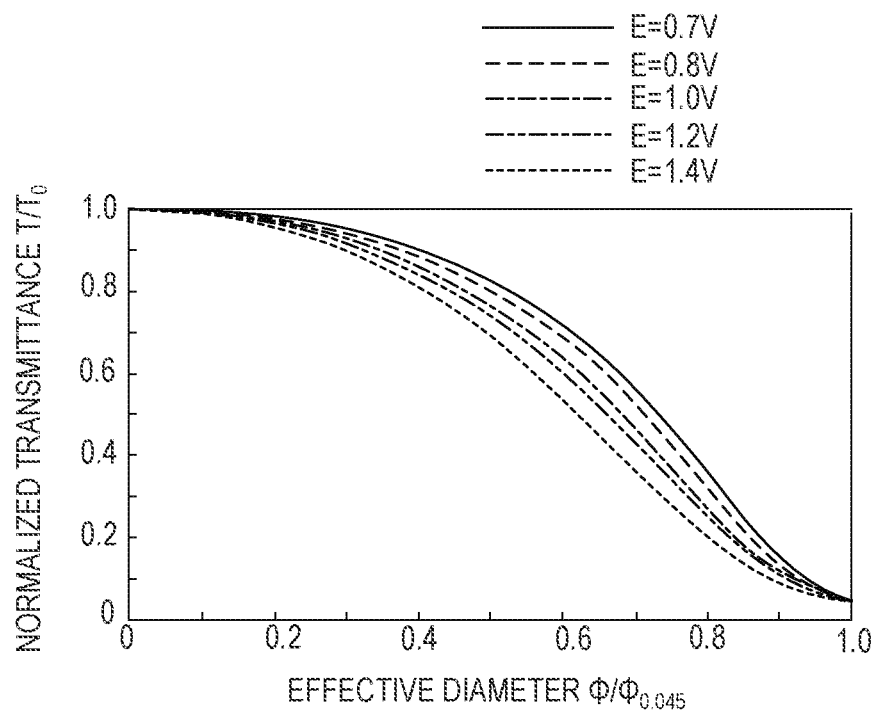
FIG. 4 is a diagram showing the transmittance distribution of an EC element when the effective diameter ratio position at which the normalized transmittance is 0.045 is normalized as the effective diameter=1.

FIG. 3 shows the transmittance distributions of the EC element (the sheet resistance $r_s$=60Ω) having the resistance ratio of 9.8 when the applied voltage is increased. It can be seen that increasing the voltage gradually narrows the effective diameter. Then, FIG. 4 shows the transmittance distributions normalized with the effective diameter ratio $\Phi_{0.045}$ at which the normalized transmittance (T/T$_0$)=0.045 as the effective diameter (Φ/$\Phi_{0.045}$)=1 for each voltage plot. It can be seen that the transmittance at the intermediate position gradually decreases when the voltage is increased.

Figure 5:
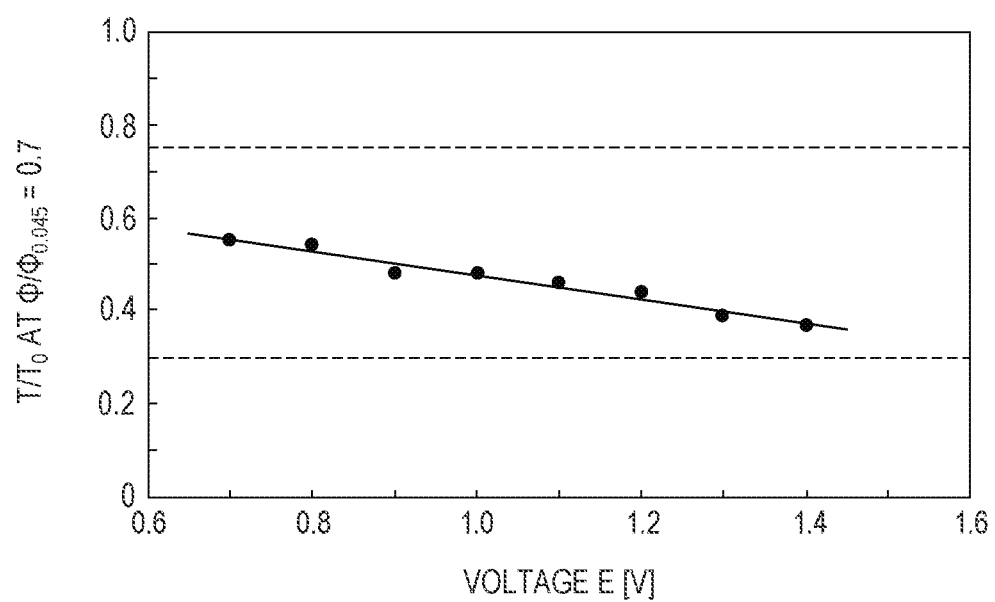
FIG. 5 is a graph showing the normalized transmittance at a position with the effective diameter of 0.7 with respect to the voltage.

Then, FIG. 5 shows a plot of normalized transmittance (T/T$_0$) at the position of the effective diameter (Φ/$\Phi_{0.045}$)=0.7 with respect to voltage. The dashed lines above and below the plot show the lower limit 0.3 and upper limit 0.75 of the range of suitable normalized transmittance (T/T$_0$) corresponding to the range of the suitable resistance ratio (r/R) that is 2 or more and 20 or less. Table 2 shows the parameter setting at each voltage and the normalized transmittance (T/T$_0$) at the position of the effective diameter (Φ/$\Phi_{0.045}$)=0.7.

Although the normalized transmittance (T/T$_0$) decreases substantially linearly with the voltage, it can be seen that the normalized transmittance (T/T$_0$) falls within a range that is 0.3 or more and 0.75 or less, which is a range of the suitable normalized transmittance (T/T$_0$).

By increasing the voltage from 0.7 V to 1.4 V, the effective diameter becomes smaller up to an effective diameter ratio Φ=about 0.7 (corresponding to the diameter change of one stage of the diaphragm) as shown in FIG. 3, but even in this case, the effective diameter is within a range of the suitable transmittance distribution from the effective diameter (Φ/$\Phi_{0.045}$).

Since the transmittance drop at the intermediate position corresponding to the diaphragm change of one stage is 0.18 and the width of the range of the suitable transmittance is 0.45, it is possible to follow the diaphragm change of two stages or more by setting the resistance ratio (r/R) near the upper limit of the range. Therefore, the resistance ratio (r/R), which can realize a transmittance distribution suitable as a variable apodization filter, becomes 9 or more and 20 or less as a more suitable range.

TABLE 2

| E [V] | 0.7 | 0.8 | 1.0 | 1.2 | 1.4 |
|---|---|---|---|---|---|
| $r_s$ [Ω] | 60 | 60 | 60 | 60 | 60 |
| L [mm] | 46 | 46 | 46 | 46 | 46 |
| d [μm] | 30 | 30 | 30 | 30 | 30 |
| ρ [Ωm] | 430.88 | 430.88 | 430.88 | 430.88 | 430.88 |
| r/R | 9.8 | 9.8 | 9.8 | 9.8 | 9.8 |
| T/T$_0$ (Φ/$\Phi_{0.045}$ = 0.7) | 0.55 | 0.53 | 0.48 | 0.43 | 0.37 |

Setting of Each Parameter

Next, with respect to the EC element having a suitable resistance ratio (r/R), it will be described that the same transmittance distribution is formed as long as the resistance ratio (r/R) is the same even when the sheet resistance $r_s$ of the electrodes and the diameter L of the light modulating region are changed simultaneously.

Table 3 shows the set four parameters, the resistance ratio (r/R), and the normalized transmittance (T/T$_0$) at the position of the effective diameter ratio Φ=0.7.

TABLE 3

| $r_s$ [Ω] | 60 | 141 | 24.5 |
|---|---|---|---|
| L [mm] | 46 | 30 | 72 |
| d [μm] | 30 | 30 | 30 |
| ρ [Ωm] | 430.88 | 430.88 | 430.88 |
| r/R | 9.8 | 9.8 | 9.8 |
| T/T$_0$ (Φ/$\Phi_{0.045}$ = 0.7) | 0.55 | 0.55 | 0.54 |

Figure 6:
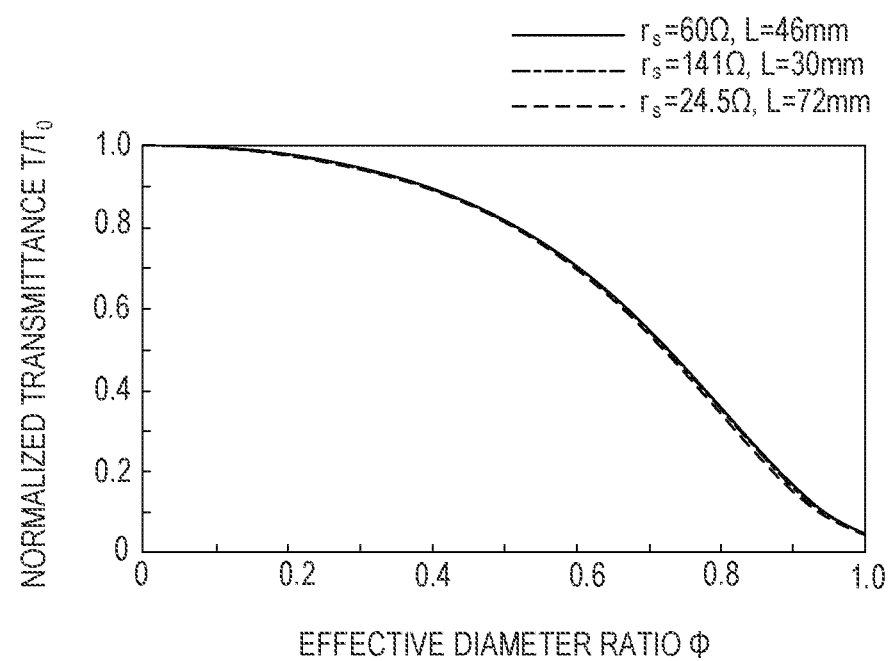
FIG. 6 is a diagram showing the transmittance distributions of EC elements having the same resistance ratio while having different sheet resistances of the electrodes and different light modulating region diameters of the electrodes.

FIG. 6 shows the transmittance distributions of the three EC elements of Table 3 having the same resistance ratio (r/R)=9.8 while having the different sheet resistance $r_s$ of the electrodes and the different light modulating region diameter L. It can be seen that the same transmittance distribution is formed when the resistance ratio (r/R) is the same irrespective of the electrode resistance r and the light modulating region diameter L.

Application of EC Element

The EC element of the present disclosure is used as a light modulating element that electrically controls the apodization effect. Specifically, the EC element can be can be applied as the variable apodization filter to a lens unit and an imaging apparatus.

Lens Unit and Imaging Apparatus

Figure 9:
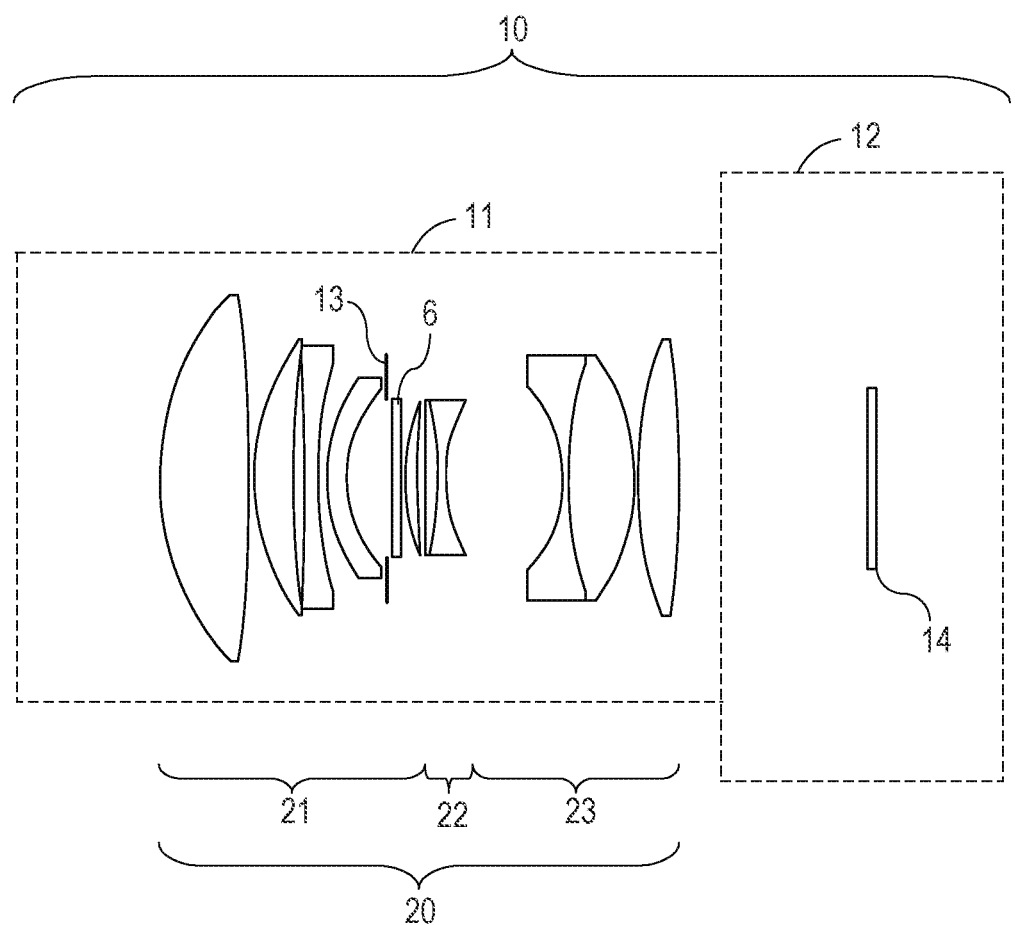
FIG. 9 is a diagram schematically illustrating a configuration of an embodiment of an imaging apparatus having a lens unit according to the present disclosure.

FIG. 9 shows an imaging apparatus 10 having a lens unit 11 to which the EC element 6 of the present disclosure is applied. The lens unit 11 is detachably connected to an imaging unit 12 via a mount member. Since the EC element 6 of the present disclosure is often incorporated in the lens unit 11 side, particularly in an imaging optical system 20, in this sense, the lens unit is used when the lens unit 11 and the imaging unit 12 are detachable, and the imaging apparatus is used when the lens unit and the imaging unit are not detachable.

The imaging optical system 20 in the lens unit 11 includes a plurality of lens groups. In the present specification, a lens group is a group of lenses which move or stand still integrally in focusing, and an interval between the lens groups successively brought into contact in focusing from infinity to a short distance is changed. The lens group may be composed of one lens or a plurality of lenses.

The imaging optical system 20 includes a mechanical diaphragm 13 and the EC element 6, which operate in response to an input signal from a control unit (not shown). The imaging optical system 20 has a three-group configuration consisting of a first lens group 21 having a positive refractive index, a second lens group 22 having a negative refractive index, and a third lens group 23 having a positive refractive index. The mechanical diaphragm 13 and the EC element 6 arranged so as to make the ninth surface positioned in the mechanical diaphragm 13 and make the tenth and eleventh surfaces become the incident surface and the exit surface of the EC element 6, respectively, that is, make the EC element 6 arranged adjacent to the image side of the mechanical diaphragm 13. In the imaging apparatus 10, focusing is performed by moving the second lens group 22 having a negative refractive index to the image side.

FIG. 9 illustrates an example in which the single EC element 6 is arranged adjacent to the mechanical diaphragm 13, but a plurality of the EC elements 6 may be arranged at an arbitrary optimum position depending on the lens configuration.

The light having passed through the lens unit 11 reaches the imaging unit 12 and is received by an imaging device 14 via a glass block such as a low-pass filter, a face plate, a color filter (not shown) or the like. The imaging device 14 may be a CCD, CMOS, or the like. The imaging device 14 may be an optical sensor such as a photodiode to acquire and output information on the intensity or wavelength of light.

As illustrated in FIG. 9, when the EC element 6 of the present disclosure is incorporated in the lens unit 11, the driving means of the element may be arranged in the lens unit 11 or in the imaging unit 12 outside the lens unit 11. When the driving means is arranged outside the lens unit 11, the EC element in the lens unit 11 is connected to a driving means through wiring, and driving control is performed.

The lens unit described above may be applied to various imaging apparatuses, such as cameras, digital cameras, video cameras, digital video cameras, or the like, and may also be applied to products incorporating imaging apparatuses such as cellular phones, smartphones, PCs, tablet computers, or the like.

EXAMPLE

Example 1

A circular-shaped EC element having the configuration of FIG. 1A and FIG. 1B and the light modulating region with the diameter L=46 mm was fabricated. This was an example, in which the sheet resistance $r_s$ of the pair of transparent electrodes 2a and 2b is 60Ω, the electrode spacing d is 30 μm, the resistivity ρ of the EC layer 5 is 430.88Ωm, and therefore the resistance ratio (r/R) obtained from the equation (1) is 9.8. A thermosetting epoxy resin was used as the sealing material 4 for laminating the pair of the transparent electrode substrates, and gap control particles having a diameter of 30 μm were kneaded with the resin to define electrode intervals. The width of the sealing material 4 after the lamination was about 1.0 mm.

Figure 7:
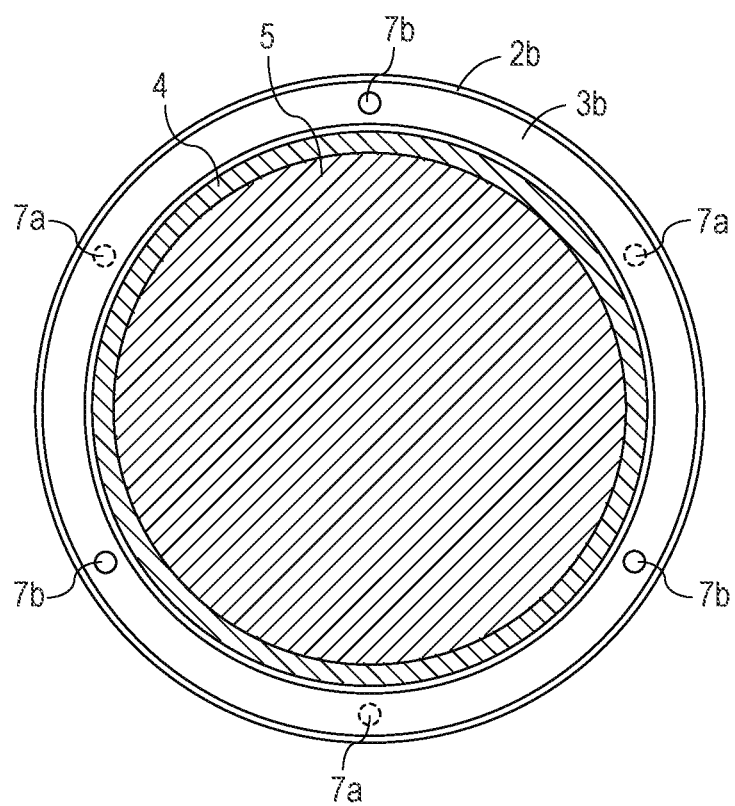
FIG. 7 is a schematic end view illustrating the feeding position of the EC element to the bus wiring according to the first embodiment of the present disclosure.

On the electrodes 2a and 2b outside the sealing material 4, the pair of the bus wirings 3a and 3b were arranged so as to surround the circular-shaped light modulating region and the sealing material 4. A silver thin film (sheet resistance=14 mΩ) having a film thickness of 1.2 μm and a width of 2.0 mm was formed as the bus wirings 3a and 3b by sputtering. The power supply portions on the pair of the bus wirings 3a and 3b were set to three points, respectively, and were alternately arranged at intervals of 60° for the bus wirings 3a and 3b. FIG. 7 illustrates the feeding position of the EC element of this example. FIG. 7 is a schematic end face view of the same position as FIG. 1A, in which 7b is a feeding position to the bus wiring 3b formed on the electrode 2b, and 7a is a feeding position to the bus wiring 3a (not shown) formed on the electrode 2a (not shown).

When a constant voltage of 0.7 V to 1.4 V was applied to the EC element having the above configuration, normalized transmittance distributions as shown in FIG. 3 were shown. At this time, the normalized transmittance distributions converted by an effective diameter (effective diameter ratio $\Phi_{0.045}$) were as shown in FIG. 4 and were able to be fall in preferable transmittance distributions.

At this time, the effective diameter was reduced to about 70%, and it was possible to operate while maintaining a suitable transmittance distribution following the diameter change of about one step of the mechanical diaphragm.

Example 2

An EC element having the same structure as in Example 1 was fabricated except that the sheet resistance $r_s$ of the transparent electrodes 2a and 2b was set to 20 Ω and the resistance ratio (r/R) was set to 3.3.

When a constant voltage of 0.7 V was applied to the EC element of this example, the normalized transmittance distribution as shown by the curve of "r/R=3.3" in FIG. 2 was shown.

Example 3

An EC element having the same structure as in Example 1 was fabricated except that the sheet resistance $r_s$ of the transparent electrodes 2a and 2b was set to 120Ω. The resistance ratio (r/R) was 19.6.

When a constant voltage of 0.7 V to 2.0 V was applied to the EC element of this example, the effective diameter was reduced to about an effective diameter ratio Φ=0.5, and the normalized transmittance distributions converted by the effective diameter (effective diameter ratio $\Phi_{0.045}$) were able to fall within the range of a suitable transmittance distribution. That is, it was possible to operate while maintaining a suitable transmittance distribution following the diameter change of about two steps of the mechanical diaphragm.

Example 4

Figure 8:
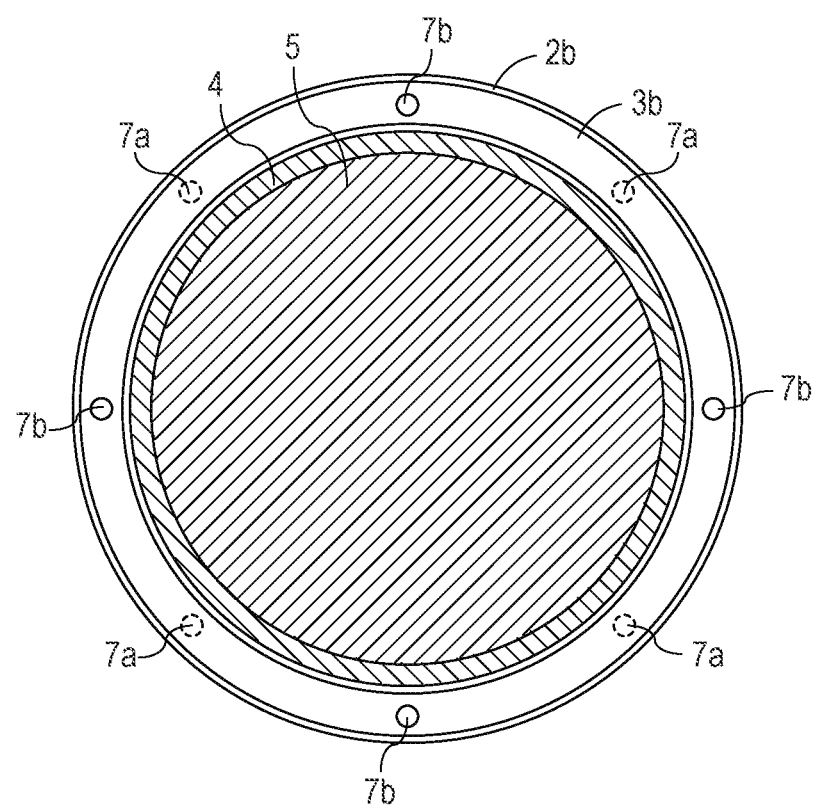
FIG. 8 is a schematic end face view illustrating the feeding position to the bus wiring in an EC element according to Example 4 of the present disclosure.

An EC element having the same structure as in Example 1 was fabricated except that the diameter L of the light modulating region was set to 72 mm, the sheet resistance $r_s$ of the transparent electrodes 2a and 2b was set to 24.5Ω, and the resistance ratio (r/R) was set to 9.8, and the bus wirings 3a and 3b and the feeding positions to the bus wirings 3a and 3b were changed. For the bus wirings 3a and 3b, a silver thin film (sheet resistance=11 mΩ) having a film thickness of 1.5 μm and a width of 2.0 mm was formed by sputtering. As illustrated in FIG. 8, the power supply positions 7a and 7b to the bus wirings 3a and 3b were respectively set to four points, and were alternately arranged at intervals of 45° for the bus wirings 3a and 3b. FIG. 8 is a schematic end face view of the same position as FIG. 1A.

When a constant voltage of 0.7 V was applied to the EC element of this example, the transmittance distribution is substantially the same as in Example 1 ($r_s$=60Ω, L=46 mm), as shown by the curve of "$r_s$=24.5Ω, L=72 mm" in FIG. 6. When the voltage is further increased and a constant voltage up to 1.4 V is applied, the effective diameter is reduced to the effective diameter ratio Φ=about 0.7, and the normalized transmittance distribution converted by the effective diameter (the diameter ratio $\Phi_{0.045}$) were able to fall within the range of a suitable transmittance distribution. That is, it was possible to operate while maintaining a suitable transmittance distribution following the diameter change of about one step of the mechanical diaphragm.

Example 5

An EC element having the same structure as in Example 1 was fabricated except that the diameter L of the light modulating region was set to 30 mm, the sheet resistance $r_s$ of the transparent electrodes 2a and 2b was se to 141Ω, and the resistance ratio (r/R) was set to 9.8.

When a constant voltage of 0.75 V was applied to the EC element of this example, the transmittance distribution is substantially the same as in Example 1 ($r_s$=60Ω, L=46 mm), as shown by the curve of "$r_s$=141Ω, L=30 mm" in FIG. 6. When the voltage is further increased and a constant voltage up to 1.5 V is applied, the effective diameter is reduced to the effective diameter ratio Φ=about 0.7, and the normalized transmittance distribution converted by the effective diameter (the diameter ratio $\Phi_{0.045}$) were able to fall within the range of a suitable transmittance distribution. That is, it was possible to operate while maintaining a suitable transmittance distribution following the diameter change of about one step of the mechanical diaphragm.

According to the present disclosure, by defining the resistance ratio between the electrodes and the electrochromic layer determined from the sheet resistance of the electrodes, the diameter of the light modulating region, the electrode spacing, and the resistivity of the electrochromic layer, a suitable transmittance distribution is realized. Further, by making the EC element follow the aperture diameter of the mechanical diaphragm of the lens, a suitable transmittance distribution is realized. Therefore, the electrochromic element of the present disclosure is preferably used as a variable apodization filter. Further, by using the optical element of the present disclosure, a lens unit having an excellent apodization effect and an imaging apparatus are provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-022450, filed Feb. 16, 2021, which is hereby incorporated by reference herein in its entirety.

What is claimed is:

1. A method of assembling an electrochromic element comprising:
   providing a pair of electrodes; and
   providing an electrochromic layer disposed between the pair of electrodes, a shape of a light modulating region viewed from a normal direction of the electrode being circular,
   wherein the pair of electrodes and the electronic layer are selected such that, when a sheet resistance of the electrode is $r_s$ (Ω), a resistance of the electrode is r (Ω), a diameter of the light modulating region is L (m), a distance between the pair of electrodes is d (m), the resistivity of the electrochromic layer is ρ (Ωm), and a resistance of the electrochromic layer is R (Ω), a resistance ratio (r/R) between the electrode and the electrochromic layer, as shown in equation (1), is 2 or more and 20 or less:

$$r/R = (r_s L^2)/(\rho d). \qquad (1)$$

2. The method according to claim 1,
   wherein the pair of electrodes and the electronic layer are selected such that the resistance ratio (r/R) is 9 or more and 20 or less.
3. The method according to claim 1,
   wherein the pair of electrodes and the electronic layer are selected such that a normalized transmittance at the position where an effective diameter ratio is 0.7 is within 0.3 or more and 0.75 or less.
4. The method according to claim 1,
   wherein the pair of electrodes and the electronic layer are selected such that a normalized transmittance at the position where an effective diameter ratio is 0.7 is within 0.5 or more and 0.75 or less.
5. The method according to claim 1,
   wherein a voltage is supplied to each of the pair of electrodes from an outer peripheral portion.
6. The method according to claim 1,
   wherein the electrochromic layer contains an anodic electrochromic compound and a cathodic electrochromic compound.
7. The method according to claim 1,
   wherein the electrochromic layer includes at least one polymer selected from the group consisting of polyacrylonitrile, carboxymethylcellulose, pullulan-based polymer, polyvinyl chloride, polyethylene oxide, polypropylene oxide, polyurethane, polyacrylate, polymethacrylate, polyamide, polyacrylamide, polyester and polymethylmethacrylate.

8. The method to claim 1,
wherein in a plan view, the electrochromic element includes the light modulating region,
wherein each of the pair of electrodes connects to a feeding position where voltage may be supplied to each of the pair of electrodes, and
wherein the feeding positions are disposed in a region other than the light modulating region.

9. The method according to claim 8,
wherein the feeding position at one of the pair of electrodes does not overlap the feeding position at the other of the pair of electrodes.

10. The method according to claim 1,
wherein the pair of electrodes are parallel.

11. An electrochromic element assembled according to the method of claim 1.

12. A lens unit comprising:
an imaging optical system including a plurality of lenses; and
a light modulating element that electrically controls apodization effect on the imaging optical system,
wherein the light modulating element is the electrochromic element according to claim 11.

13. An imaging apparatus comprising:
an imaging optical system including a plurality of lenses;
a light modulating element that electrically controls apodization effect on the imaging optical system; and
an imaging device that receives light that has passed through the imaging optical system,
wherein the light modulating element is the electrochromic element according to claim 11.

* * * * *